United States Patent Office 3,562,291
Patented Feb. 9, 1971

3,562,291
INSTANTANEOUS FRICTION REDUCING ADDITIVE FOR POLYETHYLENE, POLYPROPYLENE AND THEIR CO-POLYMERS
Hans Harald Lutzmann, Cleveland, Ohio, and Nicholas M. Molnar, New York, N.Y., assignors to Fine Organics, Inc., Lodi, N.J., a corporation of New York
No Drawing. Filed July 24, 1968, Ser. No. 754,157
Int. Cl. C08f 45/44
U.S. Cl. 260—32.6    2 Claims

ABSTRACT OF THE DISCLOSURE

Fatty acid amides of which 70 to 90 percent by weight is erucamide and 10 to 30 percent is laurylamide, are added to polyolefin resins in the proportion of approximately 0.05% to 0.20% thereof by weight to impart substantially instantaneous slip to films and the like extruded from melts of the resin.

---

Fatty acid amides have long been used as additives to polyethylene resins to reduce the surface friction of manufactured articles such as sheet, film and bottles. Also, it is known that unsaturated amides of 18–22 carbon atoms will reduce surface friction of such film shortly after the film has been produced, although it appears that there is a lapse of approximately thirty minutes after production of the film until an appreciable reduction in surface coefficient of friction can be noticed. Also it is known that saturated fatty acid amides containing from 18 to 22 carbon atoms will affect the slip and anti-blocking properties of polyethylene film. Specifically the saturated amides containing from 18 to 22 carbon atoms give pronounced antiblocking properties without lowering the coefficient of friction into the commercial category of high slip films (Commercial Standard CS 227). The saturated amides containing from 12 to 16 carbon atoms, on the other hand, have been reported to markedly reduce the coefficient of friction of polyethylene, but it has been found that said reported values do not satisfy the commercial requirements of high slip film.

A decided disadvantage of the said previously proposed additives is that while the polyethylene film is still within the confines of the manufacturing process, the additives do not impart sufficient reduction in surface friction to allow the film to slide laterally on metal transfer rollers. This tends to cause tension wrinkles that often are permanently pressed into the film and impair its usefulness.

It is the object of this invention, therefore, to provide an additive which will produce instantaneous reduction of surface friction, while long term frictional behavior is being essentially maintained, and antiblocking properties remain substantially unaffected. None of the known additive systems were found to produce this combination of properties.

It has now been discovered by us that a combination of erucyl amide and laurylamide, in a certain ratio of concentration, will provide the desired low surface condition within a few seconds after leaving an extruding or other sheet or film former, as a melt. Then, after thirty minutes, the film or sheet possesses slip and antiblocking properties typical of erucyl amide and other conventional additives. It further has been found that the concentration of laurylamide in the mixture of erucyl amide and polyolefin is critical. At too low a concentration no decrease of surface friction was noted, and at too high a concentration blocking increases to an unacceptable level. It is necessary, therefore, that the concentration be within a critical range to satisfy commercial requirements.

EXAMPLE 1

The indicated amounts of erucyl and lauryl amide in "Table 1" below were intimately mixed with a low density polyethylene resin marketed as DFD 0331 by Union Carbide Corporation. The mixtures were each extruded into film through an annular die at a temperature of about 190° C. The film thickness was 0.00125 inch and the extrusion rate sixty feet per minute. The time for the film to travel from the die to the winder was 30 seconds. During extrusion of the films it was observed that within 20 to 30 seconds after leaving the die, sample noted under "Control 5" below had a high rate of slip exudation, which markedly improved winding. This was shown by introducing a wrinkle just before the film entered the winder. In a matter of three or four revolutions of the winding spindle, the wrinkle smoothed out. All other samples did not behave in this manner.

The coefficient of friction and blocking was then measured after the film had been aged for twenty-four hours. The coefficient of friction was determined by test method ASTM D1894, Procedure A. The blocking test was performed on samples which had been conditioned at 120° F. for twenty-four hours under a load of one pound per square inch. The films were allowed to cool and were then placed between 4 x 4 inch plates. The force to separate the film contacting surfaces normal to their plane of mounting is expressed in grants under the heading "Blocking."

TABLE 1.—EVALUATION OF THE EFFECT OF ADDITIVES ON POLYETHLYENE FILM

| Control No. | Percent erucamide | Percent lauryl-amide | Percent antiblock | COF 24 hrs. | Blocking |
|---|---|---|---|---|---|
| | 0 | | | 1.07 | 65 |
| 1 | 0.07 | | 0.03 | 0.10 | 40 |
| 2 | 0.035 | | 0.15 | 0.13 | 61 |
| 3 | 0.045 | 0.005 | | 0.09 | 57 |
| 4 | 0.090 | 0.010 | | 0.09 | 42 |
| 5 | 0.080 | 0.020 | | 0.10 | 40 |
| 6 | 0.040 | 0.010 | | 0.13 | 57 |

While Control No. 5 did not differ in coefficients of blocking and friction from No. 1, it did provide the desired low coefficient of surface friction immediately after extrusion, and did not affect the surface properties measured 24 hours after extrusion.

EXAMPLE 2

Two polyethylene compounds containing the indicated amounts of lauryl and erucyl amides, and the indicated amount of antiblocking agents (diatomaceous earth and/or calcium carbonate, particle size 5 to 50 microns) were extruded on a one and one-half inch extruder equipped with a tubular die, into film of a thickness of 0.0015".

The surface friction of both films was measured as quickly as possible after extrusion, and the result was the same with both of the polyethylene compounds, with the indicated amounts of additive (erucyl amide and lauryl amide). The first measurement was taken two minutes after extrusion, and subsequent measurements at 5, 30 and 60 minutes after extrusion.

TABLE 2

| | Sample 1 | Sample 2 | Sample 3 |
|---|---|---|---|
| Erucyl amide, percent | 0.07 | 0.063 | 0.068 |
| Lauryl amide, percent | None | 0.007 | 0.012 |
| Calcium carbonate | 0.05 | 0.05 | 0.05 |
| C.O.F.: | | | |
| 2 minutes | 1.00 | 0.6 | 0.35 |
| 5 minutes | 0.80 | 0.4 | 0.26 |
| 30 minutes | 0.25 | 0.10 | 0.10 |
| 60 minutes | 0.18 | 0.10 | 0.10 |
| 24 hours | 0.10 | 0.10 | 0.10 |
| Blocking | 40 | 40 | 40 |

Table 2 shows that the development of slip occurs faster with increasing amount of lauryl amide without affecting blocking. The coefficient of friction was determined by test method ASTM D 1894, Procedure A, and the blocking was determined by test method ASTM D1893, performed on samples conditioned at 120° F. for twenty-four hours under a load of one pound per square inch.

It will be understood that the film-forming resin, although in the examples as polyethylene, may comprise copolymers of ethylene generally recognized as equivalents in film forming and such comonomers as vinyl acetate, ethyl acrylate, acrylic acid, propylene and benzene as minor constituent, i.e., up to 10 mole percent.

Having described our invention, what we claim and desire to obtain by Letters Patent, is as follows:

1. A composition comprising at least one member of the group of polyethylene, polypropylene, and their copolymers, and 0.05% to 0.10% by weight of fatty acid amides of which 70 to 90% is erucamide and 10 to 30% is laurylamide.

2. A composition comprising copolymers of ethylene, and monomers selected from the group consisting of vinyl acetate, ethyl acrylate, acrylic acid, and propylene up to 10 mole percent, and 0.05% to 0.20% by weight of fatty acid amides of which 70 to 90% is erucamide and 10 to 30% is laurylamide.

References Cited
UNITED STATES PATENTS

| | | | |
|---|---|---|---|
| 2,770,608 | 11/1956 | Barker | 260—32.6 |
| 3,330,796 | 7/1967 | Mock | 260—32.6 |
| 3,470,122 | 9/1969 | Ridgeway et al. | 260—32.6 |

HOSEA E. TAYLOR, Primary Examiner

U.S. Cl. X.R.

260—41